Dec. 6, 1938. G. S. MEIKLE Re. 20,939
APPARATUS FOR PRODUCING COMBUSTION
Original Filed April 26, 1927 2 Sheets-Sheet 1
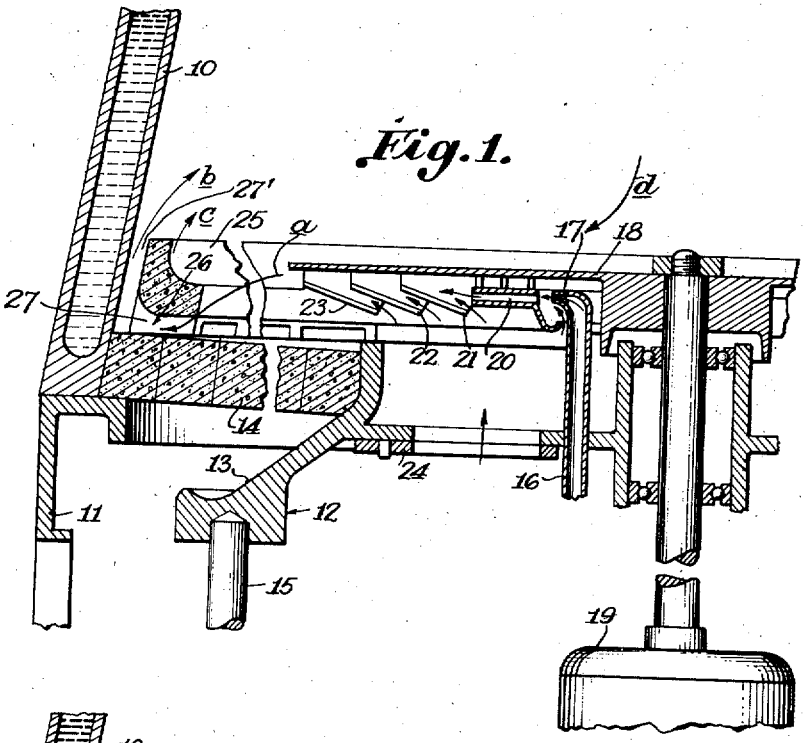
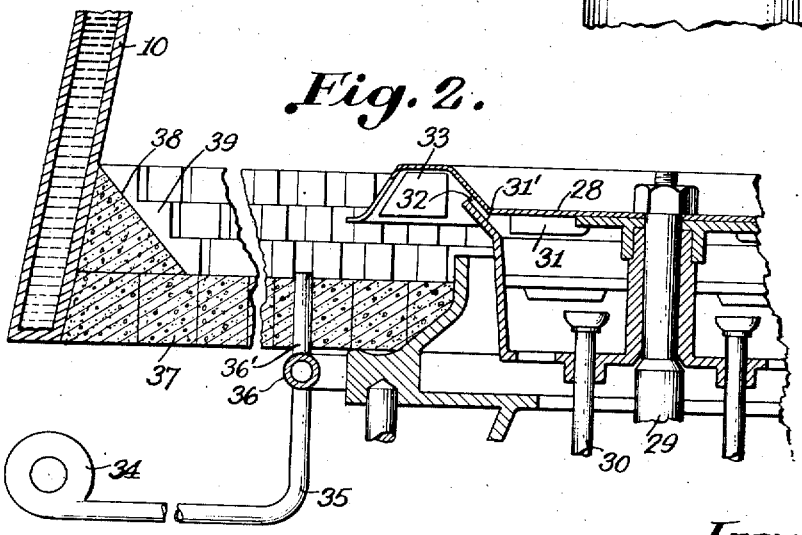
Inventor.
George Stanley Meikle
By Dike, Calver & Gray
Attys.

Dec. 6, 1938. G. S. MEIKLE Re. 20,939

APPARATUS FOR PRODUCING COMBUSTION

Original Filed April 26, 1927 2 Sheets-Sheet 2

Inventor.
George Stanley Meikle
By Dike, Calver & Gray
Attys.

Reissued Dec. 6, 1938

Re. 20,939

UNITED STATES PATENT OFFICE 20,939

APPARATUS FOR PRODUCING COMBUSTION

George Stanley Meikle, West Lafayette, Ind.

Original No. 1,856,720, dated May 3, 1932, Serial No. 186,625, April 26, 1927. Application for reissue April 30, 1934, Serial No. 723,279

14 Claims. (Cl. 158—4)

This invention relates to apparatus for effecting combustion of liquid fuels.

More particularly, this invention relates to apparatus for effecting the combustion of liquid hydrocarbons in the combustion chamber of ordinary domestic furnaces.

The object of the invention is to provide suitable apparatus for effecting improved combustion of liquid hydrocarbon fuels whereby combustion of relatively high efficiency results, giving a bluish flame that is substantially smokeless.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawings, in which:

Fig. 1 is a fragmentary view, mainly in section, with parts broken away showing a burner installed in a domestic furnace for the practice of the present invention;

Fig. 2 is a similar view, showing a modified arrangement for the practice of the present invention;

Figure 4:
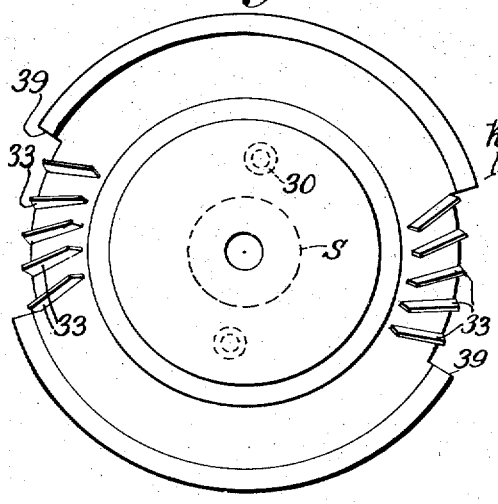
Fig. 4 is a horizontal sectional view through the burner top shown in Fig. 3.

Referring now to the drawings, and particularly to Fig. 1, 10 denotes a water-leg of an ordinary domestic furnace which extends downwardly to form one wall of the combustion chamber. The water-leg 10 is supported upon a base 11 which may comprise and is here shown as the ash pit for the furnace. A burner 12, which extends upwardly into the combustion chamber from the ash pit, has a base 13, and is of sufficient height to enable it just to project above a layer of firebrick 14 which forms a hearth that is disposed snugly between the base 13 and the lower edge of the water-leg 10 so as to close off completely the bottom of the combustion chamber in an airtight manner. The base 13 of the burner is shown supported on suitable lugs 15 that rest on the floor or other support in the ash pit.

The burner is of a type adapted for burning liquid hydrocarbon fuels, and to this end has one or more fuel-feeding nozzles 16 extending upwardly through the base, each having an outwardly turned tip 17 from which there issues a spray or jet of the liquid hydrocarbon fuel. In order that this spray or jet may be properly atomized, and mixed with the air for combustion purposes, the burner is provided with a rotating head 18, the head being driven at a relatively high rate of rotation by any suitable means, for example, by a directly coupled electric motor as shown at 19.

The nozzles 16 are adapted to discharge into a plurality of tubular passages 20 disposed in an annulus on the under side of the head 18. These discharge tubes have a diameter so proportioned to the nozzles 16 and are disposed such distance therefrom that there is an entraining action for air as the nozzles 16 discharge thereinto.

When the head 18 rotates, it is seen that a centrifugal force operates to accelerate the passage of the mixed air and hydrocarbon fuel in the passages 20 in an outward radial direction. In order, however, that the mixture which issues from the passages 20 shall be more thoroughly atomized and mixed with air for combustion, the issuing mixture is made to pass through a series of conical baffles, here shown at 21, 22 and 23. These baffles are nested, and by reason of this arrangement, project slightly into each other successively, so that when the head is rotating they entrain additional air, by the injector principle, as the combustible mixture passes through the same. In order that the air supply to the burner may be regulated, the base 13 is shown as provided with a sliding member 24 which may be partially rotated about the vertical axis of the burner in order to operate as a shutter for controlling the air supply. Provision to force fuel jets to issue from the nozzles 16, can be made in any convenient manner; for example, by the hydrostatic pressure of a constant head of fuel under gravity feed (not shown here in the interest of clearness).

The burner head 18 is rotated at a velocity sufficient to project the combustible mixture a considerable distance beyond the rim of the head before it has had time to ignite. In a given installation, this mixture accumulates and ignition takes place adjacent the water-leg 10. To facilitate combustion at this place, fillet-like refractory blocks 25 are disposed upon the hearth 14 about the circumference thereof adjacent the water-leg. These blocks do not fit snugly down on the hearth nor tight against the water-leg but are spaced some distance away from each. The fillet-blocks 25 are accordingly shown as having supporting ledges 26 extending downwardly therefrom onto the hearth supporting the same, and providing base passages 27 which extend to the rear and communicate by vertical channels 27' with the combustion chamber. In operation, it is thus seen that the function of the burner head when rotating is to supply in highly atomized condition, a combustible mixture in multi-jet form and to project it horizontally with sufficient velocity that ignition takes place some distance from, rather than at, the rim of the burner head, or in other words, the velocity of the combustible mixture is in excess of the velocity of flame propagation.

Here the hearth and the refractory fillet-blocks cooperate with the burner in a manner quite different from that heretofore practiced in the combustion art, and provide the means for carrying out an important step in the practice of the method of the present invention. The average jet of atomized mixture, as it approaches the fillet-blocks, follows the arrow at *a* and is drawn under and about the same, rising into the combustion chamber as indicated by the arrows *b* and *c*. In this region the principal part of the combustion takes place, heating the walls of the water-leg and also the hearth and refractory fillet-blocks. The heat absorbed by these refractories is not lost, as it is radiated away, but is utilized in increasing the efficiency of the combustion. (That radiated to the water-leg is utilized in heating the water as usual.) The heat radiated inwardly by the refractories is seen to be radiated against the advance of the jet-like mixture. Consequently as it advances over the hearth toward the water-leg, it becomes subjected to a heating effect of increasing intensity until it finally bursts into flame on and under the fillet-blocks. The heating zone through which the sheet-like combustible mixture passes, when thus traversed by radiant heat, reacts to crack the hydrocarbon fuel and cause a partial union between it and the oxygen contained in the air supplied for supporting combustion. This union may be other than a full chemical union and may be, therefore, termed an oxygenation process, so that when the jets of combustible mixture finally reach the heated refractories at 25, the mixture contains substantially only the most volatile hydrocarbons intimately associated with oxygen and will not be disintegrated by contact with the water-leg 16 into free carbon. The flame, in consequence of this cracking, is very stable and burns as a bluish flame, without soot, at the walls of the water-leg where the heat evolved is quickly absorbed.

By reason of the intimate mixing of air and atomized fuel, which is effected in the burner head when rotating, and by reason of the partial oxygenation that takes place when the jets of combustible mixture traverse the heating zone, substantially complete combustion takes place in the flame at the water-leg, without the presence of any excess air. As a consequence a combustion process is had in which high efficiencies are attained. The placing of the flame against the water-leg results in such complete absorption of heat from the gases during combustion, that the flue gases escaping from the combustion chamber have a relatively low stack temperature, as well as contain only substantially the correct ratio of carbon dioxide gas to the neutral gases.

By the arrangement of the burner head centrally with respect to the hearth, over which the jets of combustible mixture are projected, a circulation of the products of combustion is effected within the combustion chamber which also contributes to the efficiency of the present process of combustion. By reference to Fig. 1, it is seen that the column of gas standing directly over the burner head 18 has its lower end agitated by the rotation of the burner head and in consequence has its particles thrown radially outward from points above the rim of the head, as indicated by the arrow *d*. This action creates a downward suction in the gas column over the centre of the burner head, with a radial movement outwardly over the multi-jet mixture, which moving body of gas again moves upwardly adjacent the flame on the water-leg and, after rising therewith a certain distance, is again drawn toward the centre and downwardly by the suction of the central column of gas. This motion of the gas may be briefly termed a "vortex motion"; it results in continuous internal circulation of heated products of combustion. Such circulation in turn results in the equalization of the temperature of the burner head with that of the products of combustion, and in enveloping the jets of combustible mixture projected from the burner on both sides by heating agents; on their lower side they are adjacent the hearth, while their upper side is covered by the circulating body of gas. The circulating body of gas serves to protect the burner, and to some extent, diffuses with the jets of combustible mixture, and while at a relatively high temperature, by reason of its passage through the zone of the intense radiated heat adjacent to the flame, yet assists in preventing ignition until the water-leg is reached. This diffusion results in applying some of the remnant heat in the products of combustion, carried away from the flame on the walls of the water-leg, to the initial heating and acceleration of the partial oxygenation of the jets of combustible mixture.

The manner in which the present invention operates is thus seen to involve a succession of steps by which a combustible mixture is caused to issue in an atomized state from a burner orifice at such a velocity that combustion does not take place immediately at the orifice; in the next step, the atomized particles in the combustible are thereafter vaporized, partially oxygenized and cracked by heat imparted from heat-storing bodies such as the hearth and the body of gas executing the vortex movement. In the succeeding step the vaporized and cracked mixture is mixed with the heated product of combustion, preventing ignition until it is raised to a kindling temperature substantially at a surface of the body which it is desired to heat.

Figure 5:
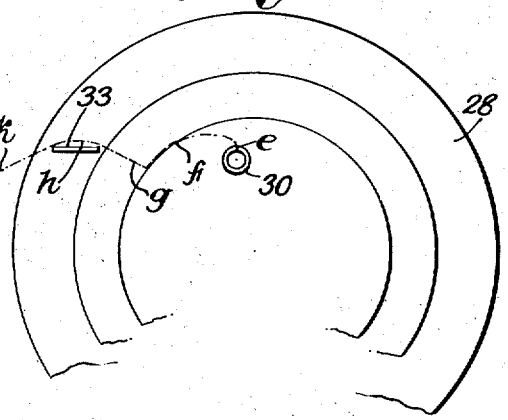
Fig. 5 is an explanatory diagram showing the manner in which parts of the burner top function.

In the modified arrangement shown in Fig. 2, all of the air for the combustible mixture is not supplied by the entering action of the atomized fuel issuing from the burner nozzle, but is blown into the same by external means. Here a burner head 28 has a driven shaft 29 for rotating it and is provided with vertical pick tubes 30 which supply a spray of atomized fuel to localized points on the wall of the burner-cup in a manner hereinafter more fully described. It will be seen that there is a local region of the burner-cup wall on which the atomized fuel impinges corresponding to each pick-tube that is secured in the bottom of the burner-cup, as indicated in Fig. 5. The fuel particles which thus issue from localized portions of the rim of the burner-cup may be described as jets or streams that issue through the annular orifice 32 and opposite with the baffles 33 are disposed. The fuel globules within the burner-cup may, if desired, be further broken up by the barrier construction 31 in the head and issues from the annular orifice 32 to encounter baffles 33 as it passes radially out from the annular orifice where it is further broken up and mixed with air. An external blower 34 has pipe connections 35 feeding an annular air trunk 36 which is adapted to supply one or more streams of air through pipes 36' for combustion purposes to the jets of combustible mixture that pass tangentially thereover. These jets, thus admixed with air, travel over the heated hearth 37 and finally impinge on the refractory structure 38 disposed about the periphery of the hearth snugly adjacent to the water-leg 10. The refractory structure shown comprises a plurality of relatively narrow steps between which are disposed grooves 39, having obliquely inclined smooth bottoms as shown. For round domestic boilers, this refractory structure may be made in the form of stepped bricks somewhat curved so that they may be placed end-to-end as segments of an arc. In this form the steps may be cut back from the ends of the bricks to provide the grooved passages 39. Each brick may be so formed as to provide passages only at its ends, or may have one or more extending crosswise of its length forming grooves in the body thereof. The stepped structure here employed is in lieu of the fillet-blocks shown in Fig. 1. The oblique passages operate to divert upwardly the impinging jets, as well as the steps. They also operate to impart a certain amount of dispersion to the radiant heat reflected inwardly toward the burner. In this manner a relatively deep heating-zone is provided which is traversed by jets of combustible mixture projected from the burner head 28, issuing in vertical banks.

Where the burner head has relatively deep baffles, as those at 33, extending over the hearth adjacent to the burner, these baffles not only operate to impart motion to the combustible mixture, but operate also to set in motion the under strata air or gas lying directly upon the hearth beneath the jets of combustible mixture. This setting in motion is accomplished by the centrifugal force acting on the body of air or gas about the baffles. The radial movement of the body causes an upward suction lifting the air or gas directly from the hearth. These results in consequence a vortex movement of the smaller body of gas directly beneath the projected jets of combustible mixture similar to the one above produced as described in connection with Fig. 1, except that its direction of rotation in radial planes is in the opposite direction. This lower vortex assists in conveying some heat to the jets of combustible mixture but assists principally in supplying further air for combustion and in the process of oxygenation.

Figure 3:
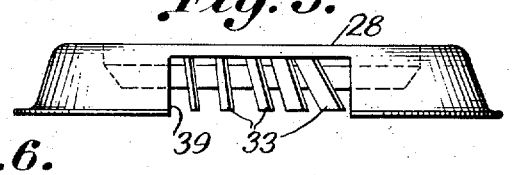
Fig. 3 is a view showing in elevation a detail of the burner top shown in Fig. 2.

These baffles 33, if made relatively deep, will set a relatively large body of gas in motion beneath the jets of combustible mixture. It is desirable in consequence to limit the baffles both in number and in depth. They are accordingly not disposed uniformly about the under side of the head, but are disposed preferably only about limited segmental orifices as indicated in Fig. 3. Here the head 28 has two segmental orifices 39 disposed on opposite sides of the head, each orifice having a limited number of baffles 33. This will more clearly appear by reference to Fig. 4. These baffles, however, are not disposed along radial lines, since it is desired that they should cooperate in atomizing the spray of fuel oil that issues from the tops of the pick-tubes 30, but on tangents to a circle shown at S.

The trajectory traversed by a particle of spray from a pick-tube 30 is diagrammatically shown in Fig. 5, where the curve is drawn relative to the burner cup. The particle starts at *e* to move radially outward from the tube 30, under the influence of centrifugal force. This particle continues moving radially outward from the tube, as it turns away. (In the drawings the direction of rotation here assumed is clockwise and is indicated by the arrow placed above the plan of the head.) The particle in consequence appears to veer to the left relative to the tube 30. The particle, during this movement accelerates outwardly until it strikes the side of the burner cup, indicated in the sketch at point *f*. Here it slides under its own inertia along the side of the cup and upwardly until it moves radially out over the lip 31'. The portion of the curve passing over the lip is denoted *g*. When the particle leaves the lip 31', it is again free to travel in space outwardly. At this point, however, it is desirable to dispose a baffle 33 in its path to intercept its travel but arranged to interpose relatively little resistance. This involves the angular disposition shown for the baffle. Its path on the baffle is indicated at *h*.

In case the particle had a velocity such that it left the lip of the cup at a point later in the cycle of rotation than shown, its radial velocity would, of course be different when it left the lip and the baffles 33 at such points would have a correspondingly different angular disposition with respect to the radii. This is clearly shown in Fig. 4. The particle, when it leaves the baffle 33, is again permitted to accelerate in free space and traces the backwardly curved trajectory denoted at *k*.

The path of the particle here traced may be the path of a single globule of fuel oil, or it may be the path of a mere geometrical particle which denotes the average path of the atomized bodies that result from a single globule which issues from the tube 30. Such a globule, when it arrives at *f* generally becomes flattened into a thin film of oil on the side of the cup and coalesces with other globules on the side of the cup. This film, as it leaves the lip 31' breaks up again into a great number of globules much smaller than those issuing from the tube 30, by reason of the thinness of the film. These fine globules undergo still further atomization on the baffle blades 33, and enter upon the portion of the trajectory at *k* in a very highly atomized condition and are readily completely volatilized in the heating zone which they here traverse. These fine globules are projected at such a high velocity that they cannot retain their original spherical shape but become flattened by the resistance of the air into oblate ellipsoids with their shortest axis lying in the direction of travel.

The flattening action upon the fuel globules produced by the high velocities here employed have been ascertained to be beneficial to the process of combustion here practiced, since the globules thereby expose a greater surface substantially normally to the influence of the radiant heat radiated from refractory structure in the heating zone.

Figure 6:
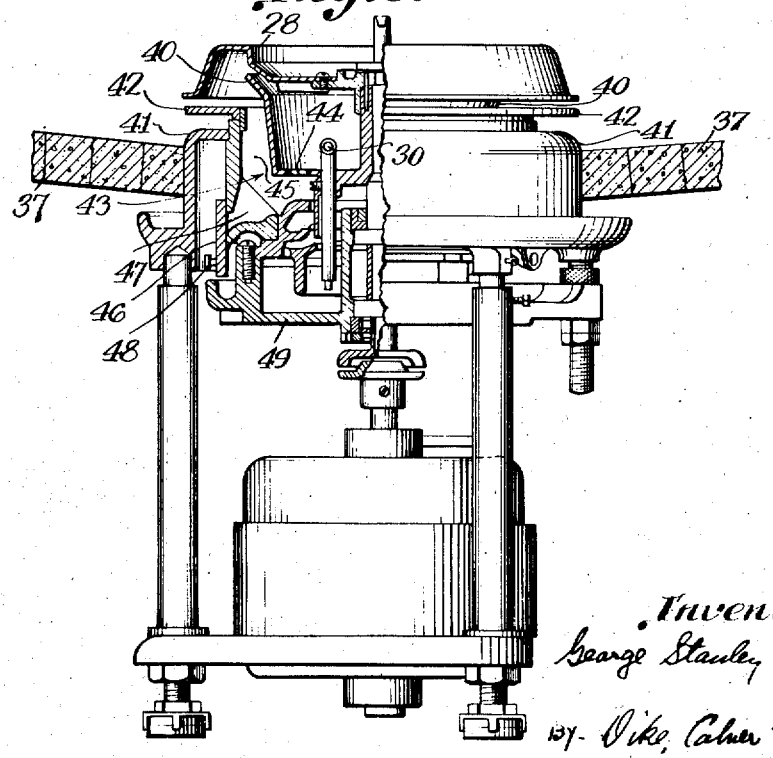
Fig. 6 is a view partly in section and partly in elevation showing another modified form of burner for practicing the present invention.

If it should be desired to employ the baffle structure shown at 33 in the burner head, and yet suppress the vortex motion of the lower body of gas so that the projected combustible mixture may come more closely in contact with the hearth as in Fig. 1, this may be accomplished by the modified arrangement shown in Fig. 6. Here the burner head 28 is mounted on a burner cup 40 which is surrounded by a burner casing 41 projecting up into the combustion chamber and so formed with a flange 42 disposed to project outwardly to the edge of the rim of the burner head so that suction on the body of air or gas in the combustion chamber directly beneath the jets of combustible mixture is substantially cut off.

In the arrangement shown the suction induced by the baffles 33 (not shown in Fig. 6) on head 28 draws air in from an air chamber 43 provided in the burner casing as a draft chamber for furnishing air for combustion both through the holes 44 in the bottom of the burner cup and through an annular passage 45 about the burner cup. The latter air supply is generally termed "secondary air", since it is not incorporated in the first instance in the fuel mixture that is formed in the burner cup, but is later admixed by the baffles 33. The first incorporated air is generally termed "primary air".

It is preferable to regulate the air supplied in this manner other than by the velocity of rotation imparted to the head. Hence a circular air damper 46 is shown for controlling the air admitted through passages 47 to the air chamber 43. This damper is provided with any convenient means for adjusting it vertically up and down; for example with the manually actuated stud 48. By this arrangement the primary and secondary air are simultaneously controlled. It is not essential to do this however, since means may be provided for controlling either the primary or secondary air independently.

Depending from the air chamber is the oil well casing 49 into which the pick-tubes 30 depend in order to raise an oil spray therefrom by the principle of relative velocities, as set forth in Letters Patent of the United States 1,624,350 issued April 5, 1926, in the name of H. D. MacKaye and myself, to which reference should be had for a fuller understanding of the operation of the parts here conventionally shown.

In this arrangement, which is adapted to effect a more complete initial atomization of the fuel than with the first described arrangement, the combustible mixture passing over the hearth is cracked and vaporized by heat supplied by the hearth and the superincumbent body of gas in substantially the same manner as set forth above.

Since certain changes in carrying out the construction set forth, which embody the invention may be made without departing from its scope, it is intended that all matter contained in the above description or shown in the accompanying drawings shall be interpreted as illustrative and not in a limiting sense.

Having described my invention, what I claim as new and desire to secure by Letters Patent is:

1. In a burner structure, the combination with a rotatable head having means for ejecting jets of liquid fuel, of impacting means for atomizing said jets, means for admixing air to form a combustible mixture, said head being provided with an opening through which said mixture is projected at a relatively high velocity, refractory heat storage means disposed cooperatively adjacent said head over which said projected mixture passes, and means disposed at some distance from said head for reducing the velocity of said mixture whereby a blue flame combustion of said mixture is effected substantially at said means.

2. In a burner structure, the combination with a rotatable head having means for ejecting jets of liquid fuel, of impacting means for atomizing said jets, means associated with said atomizing means for entraining air to form a combustible mixture, said head being provided with an orifice through which said mixture is projected at a relatively high velocity, a refractory heat storage body disposed cooperatively adjacent the said head and arranged to heat the projected mixture passing thereover and means disposed on said body at some distance from said head for reducing the velocity of said mixture, whereby a blue flame combustion of said mixture is effected at a surface to be heated, disposed adjacently to said means.

3. In a burner structure, the combination with a rotatable head having a fuel ejecting nozzle structure associated therewith for emitting jets of liquid hydrocarbon fuel, of a baffle structure carried by said head for atomizing said jets, means cooperatively associated with said head for admixing air with said atomized fuel to form a combustible mixture, said head being formed to project said combustible mixture by the rotation of said head at a relatively high velocity toward a surface to be heated, and heat-storage bodies cooperatively disposed between said burner and said surface toward which said mixture is projected, whereby the hydrocarbon component of said mixture is cracked and vaporized to effect a blue-flame combustion at the surface to be heated.

4. In a burner structure, the combination with a rotatable head having a fuel-ejecting nozzle associated therewith for emitting jets of liquid hydrocarbon fuel, of a baffle structure disposed on said head for atomizing the fuel emitted in said jets, means associated therewith for entraining air to form a combustible mixture, said head being formed with openings through which said mixture is projected radially at a relatively high velocity toward a surface to be heated, and refractory heat-storage bodies disposed in substantially air tight relation between said burner and said surface, whereby said projected mixture passes over said bodies and the hydrocarbon component of said mixture is cracked and vaporized, and whereby a blue flame combustion is effected substantially at the surface to be heated.

5. In a burner structure, the combination with a rotatable head having fuel feeding means and a rotatable open cup adapted to partially atomize a liquid hydrocarbon fuel fed thereto and fuel-ejecting nozzles adapted for rotation with said cup for emitting jets of the partially atomized liquid hydrocarbon fuel flowing from said cup, of means in said head for further atomizing said jets by impact, baffle means associated with the first said means for admixing air with said atomized fuel, a hearth cooperatively disposed about said burner structure beneath the path of said atomized fuel and extending to a surface to be heated, and means for supplying secondary air to said atomized fuel during its passage over the hearth.

6. In a burner structure, the combination with a rotatable open cup and means for supplying fuel thereto, said cup having means for emitting streams of air and partially atomized liquid hydrocarbon fuel, of a depending baffle structure disposed about the periphery of said cup, comprising a plurality of blades disposed in substantially vertical planes slightly inclined to the radii of said cup, said blades being in the path of said streams and adapted to admix additional air therewith and to effect further atomization of the fuel, and power means for rotating said cup.

7. In a burner structure, the combination with a rotatable burner cup provided with means for emitting streams of liquid hydrocarbon fuel, of a cap-plate secured to said cup having blades disposed about the periphery of said cap-plate in planes substantially at right angles to the plane of said cap-plate, said planes being slightly inclined to the radii of said cap-plate, said blades depending from said cap-plate and arranged both to atomize by impact said streams of fuel and to impel air for combustion, and power means for rotating said cup.

8. A burner unit including a centrifugal distributing head rotatably mounted with respect to a furnace, said head including a rotatable open cup having radial fuel supply tubes secured thereto to discharge a plurality of partially atomized streams of a liquid hydrocarbon fuel, means for feeding a liquid hydrocarbon fuel to said cup, a fan element fixed to said head and having vanes extending above and below the discharge ends of said tubes and disposed radially outside said ends.

9. In a burner structure, the combination with a rotatable head provided with nozzles for emitting jets of liquid hydrocarbon fuel, of impacting means on said head for atomizing said jets, baffle means associated with said atomizing means for entraining air by the passage of said jets to form a combustible mixture, said head being formed with passages through which said mixture is projected radially at a velocity in excess of that of flame propagation toward a surface to be heated, a hearth cooperatively disposed between said burner structure and the surface to be heated in a substantially air-tight manner, and means on said hearth at a distance from said head for reducing the velocity of the combustible mixture to and extent whereby when said mixture has reached said surface, it becomes ignited and a substantially blue flame combustion results.

10. In a burner structure, the combination with a rotatable head having fuel ejecting nozzles associated therewith for emitting jets of liquid hydrocarbon fuel, of impacting means in said head for atomizing said jets, baffle means associated with the first said means for admixing air with said atomized fuel, a hearth cooperatively disposed about said burner structure beneath the path of said atomized fuel and extending to a surface to be heated, and refractory means on said hearth disposed about the periphery thereof in the path of combustion whereby radiant heat is supplied to the heating zone above said hearth.

11. In a burner structure, the combination with a rotatable head having fuel ejecting nozzles associated therewith for emitting jets of liquid hydrocarbon fuel, of impacting means in said head for atomizing said jets, baffle means associated with the first said means for admixing air with said atomized fuel, a hearth cooperatively disposed about said burner structure beneath the path of said atomized fuel and extending to a surface to be heated, and refractory deflecting means on said hearth disposed about the periphery thereof for assisting in diverting said atomized fuel upwardly in a flame at the surface to be heated, said refractory means being in the path of the products of combustion whereby it becomes highly heated and supplies radiant heat to the atomized fuel.

12. In a burner structure, the combination with a rotatable head having fuel ejecting nozzles associated therewith for emitting jets of liquid hydrocarbon fuel, of impacting means in said head for atomizing said jets, baffle means associated with the first said means for admixing air with said atomized fuel, a hearth cooperatively disposed about said burner structure beneath the path of said atomized fuel and extending to a surface to be heated, means for supplying additional air to said atomized fuel during its passage over said hearth, and refractory means on said hearth disposed about the periphery thereof for supplying radiant heat to the heating zone above said hearth which is traversed by the atomized fuel.

13. An oil burner having a rotatable head comprising a rotatable annular trough, a plurality of tubular passages secured thereto for rotation therewith and projecting outwardly therefrom, a plurality of rotary fan blades disposed adjacent the discharge ends of said tubular passages, and a stationary oil feeding tube connected with a source of oil supply and having a discharge end terminating adjacent said annular trough.

14. An oil burner adapted for mounting in a combustion chamber and comprising a rotatable annular trough and a plurality of tubular passages secured thereto for rotation therewith, a rotatable fan rotatable with said trough and having blades adjacent said tubular passages, a stationary oil supply member adapted to supply oil to said tubular passages, and driving mechanism connected with and adapted to rotate said trough and fan at a predetermined speed whereby oil admixed with air is thrown outwardly of said tubular passages and into the combustion chamber at a velocity in excess of the rate of flame propagation.

GEORGE STANLEY MEIKLE.